United States Patent [19]
Schilling et al.

[11] Patent Number: 6,039,542
[45] Date of Patent: Mar. 21, 2000

[54] PANEL DAMPED HYBRID BLADE

[75] Inventors: Jan C. Schilling, Middletown; Jay L. Cornell, Hamilton; Joseph T. Stevenson, Amelia, all of Ohio

[73] Assignee: General Electric Company, Cincinnati, Ohio

[21] Appl. No.: 08/997,832

[22] Filed: Dec. 24, 1997

[51] Int. Cl.⁷ .................................................. B64C 11/16
[52] U.S. Cl. ..................... 416/233; 416/224; 416/229 R; 416/229 A; 416/232; 416/500
[58] Field of Search ............................. 415/119; 416/144, 416/145, 224, 223 A, 193 R, 232, 233, 241 A, 230, 500, 229 R, 229 A

[56] References Cited

U.S. PATENT DOCUMENTS

| | | | |
|---|---|---|---|
| 3,327,995 | 6/1967 | Blackhurst et al. | 416/196 R |
| 3,796,513 | 3/1974 | Jonas | 416/224 |
| 4,118,147 | 10/1978 | Ellis | 416/230 |
| 5,141,400 | 8/1992 | Murphy et al. | 416/204 A |
| 5,295,789 | 3/1994 | Daguet | 416/241 A |
| 5,498,137 | 3/1996 | El-Aini et al. | 416/229 A |
| 5,634,771 | 6/1997 | Howard et al. | 416/241 A |
| 5,655,883 | 8/1997 | Schilling | 416/229 A |
| 5,720,597 | 2/1998 | Wang et al. | 416/229 A |
| 5,839,882 | 11/1998 | Finn et al. | 416/229 A |

OTHER PUBLICATIONS (Docket RD–24978) Patent application Serial No. 08/650,278, filed May 20, 1996.
(Docket RD–24735) Patent application Serial No. 08/593,757, filed Jan. 29, 1996.
(Docket RD–25135) Patent application Serial No. 08/837,880, filed Apr. 25, 1997.

*Primary Examiner*—Edward K. Look
*Assistant Examiner*—Matthew T. Shanley
*Attorney, Agent, or Firm*—Andrew C. Hess; Nathan D. Herkamp

[57] ABSTRACT

A fan blade includes a metal airfoil having first and second opposite sides extending radially between a root and a tip, and axially between a leading edge and a trailing edge. The airfoil further includes a pocket disposed in the first side having an elastomeric filler bonded therein. A panel is bonded to the filler along the pocket for allowing differential movement therebetween for damping vibratory response of the airfoil.

20 Claims, 3 Drawing Sheets

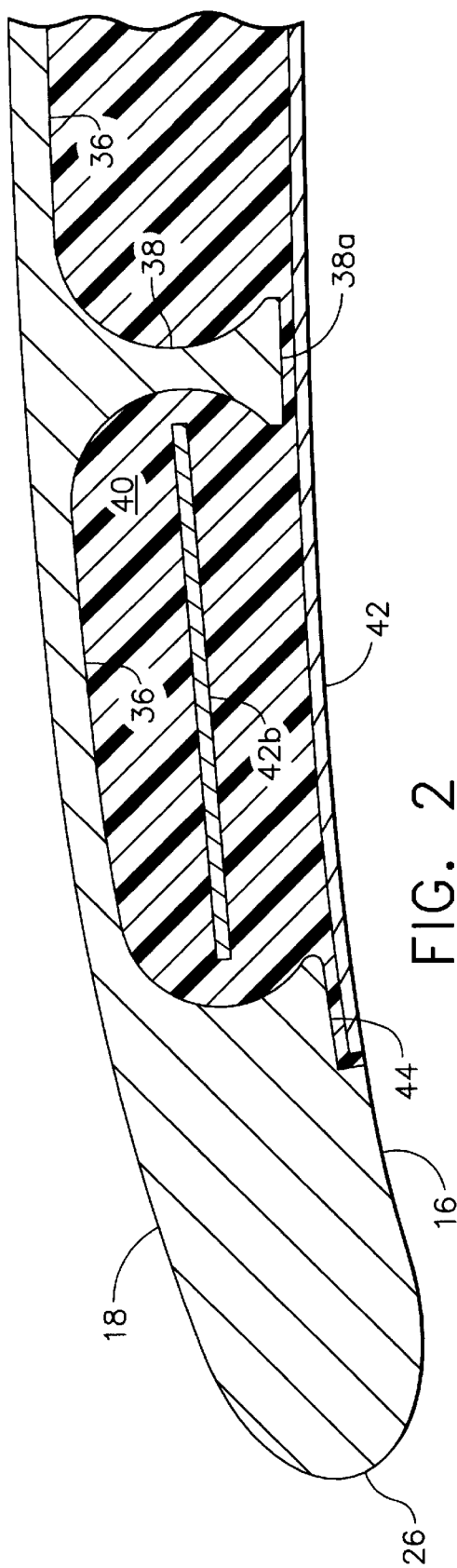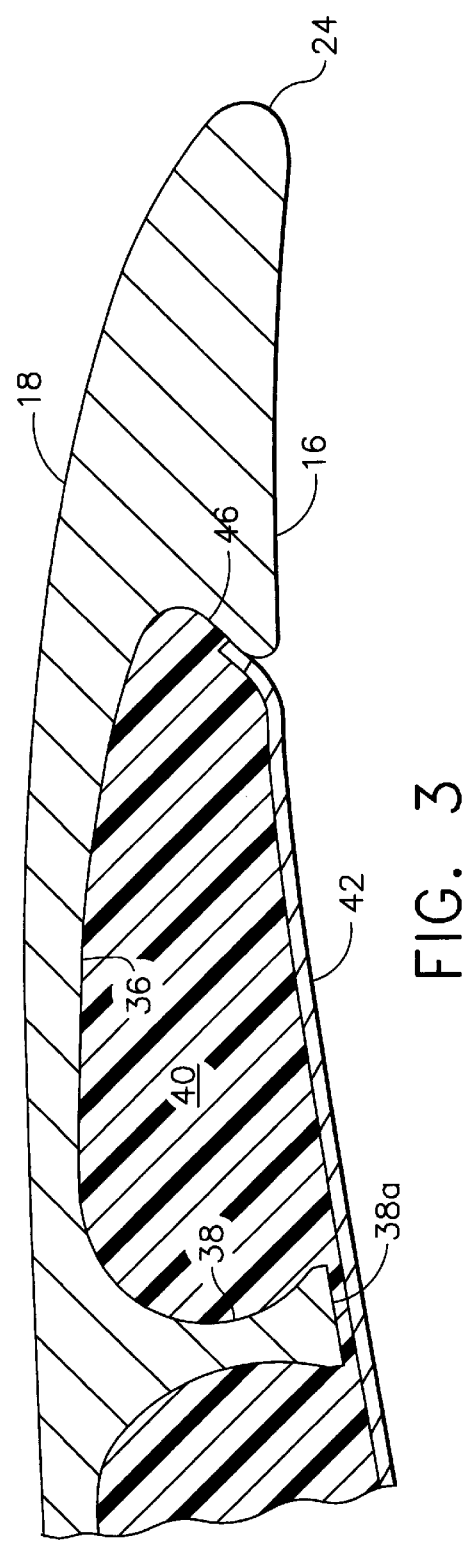

PANEL DAMPED HYBRID BLADE

BACKGROUND OF THE INVENTION

The present invention relates generally to gas turbine engines, and, more specifically, to wide chord fan blades therein.

A turbofan gas turbine engine includes a row of fan blades powered by a low pressure turbine (LPT). Air initially enters the engine through the fan and an inner portion thereof enters a compressor which pressurizes the air for mixing with fuel in a combustor and ignited for generating hot combustion gases which flow downstream through a high pressure turbine (HPT) which extracts energy for powering the compressor. The combustion gases then flow through the LPT which extracts additional energy therefrom for powering the fan. The remaining outer portion of the air flowing through the fan is discharged from the engine for producing thrust to power an aircraft in flight.

A fan blade includes a dovetail at its radially inner end which is trapped in a complementary dovetail slot in the perimeter of a rotor disk. An airfoil is attached to the dovetail by a structural shank. Platforms may be joined integrally with the blade or separately attached between adjacent blades for providing a radially inner flowpath boundary for the fan air, with the platform being radially located atop the shank at a radially inner root of the airfoil.

The airfoil extends radially outwardly to an opposite tip, and has a forward or leading edge and an axially opposite aft or trailing edge collectively defining the perimeter of the airfoil. The airfoil has a generally concave or pressure first side and a circumferentially opposite convex or suction second side. The airfoil has a span or longitudinal axis extending in the radial direction from the centerline of the rotor disk to which it is attached, and various chords extending generally axially between the leading to trailing edges. The airfoil typically twists from its root to its tip for maximizing aerodynamic performance.

Wide chord fan blades have a relatively low aspect ratio which is its span to chord ratio and are relatively heavy when formed as solid metal parts. Weight reduction is typically obtained by using high strength superalloy materials such as those including Titanium. However, as engines grow larger in size the corresponding fan blades increase in size and weight, and increase the difficulty in achieving a suitable life therefor under the high centrifugal loads generated during operation.

In separate developments, all composite fan blades have been designed for reducing weight while providing acceptable performance in the gas turbine engine environment. A typical composite blade includes several layers of structural fibers, such as graphite, embedded in a suitable matrix, such as epoxy, for tailoring blade strength in a lightweight structure. Composite blades require a complex manufacturing process and are expensive to produce.

Hybrid blades are also being developed which are primarily metal, such as Titanium, having suitable pockets therein for reducing weight, with the pockets being filled with a suitable filler material for completing the required aerodynamic profile of the airfoil. However, pockets in an otherwise structural airfoil reduce the stiffness thereof, or the corresponding moments of inertia, and thus create an additional problem in vibratory performance and foreign object damage (FOD) resistance.

More specifically, during operation a fan blade is subject to centrifugal force, aerodynamic force, and vibratory stimuli due to the rotation of the fan blades over the various operating speeds of the engine. A fan blade has various modes of resonant vibration due to the various excitation forces occurring during engine operation. A fan blade is basically cantilevered from its rotor disk and therefore may bend or flex generally in the circumferential direction in fundamental and higher order modes of flexure or flex.

The airfoil is also subject to fundamental and higher order torsional modes of vibration which occur by twisting around the airfoil span axis. The flex and torsion modes of vibration may also be coupled together further increasing the difficulty of blade design.

One or more of these vibration modes may be damped using a suitable elastomeric filler material in the weight-reducing pockets. However, the amount of damping is limited by the relative size of the pockets which reduces strain in the filler necessary for effective damping.

Furthermore, since the fan blades are the first rotating structure in a gas turbine engine which receives intake air, they are also subject to foreign object damage (FOD), due to birds strike for example. Typical fan blades are therefore also designed to have suitable FOD strength, with flexibility at the leading edge region of the blade for withstanding a bird strike with little or no permanent damage thereto. The pockets being developed for hybrid blades necessarily decrease the stiffness of the airfoil aft of the leading edge thusly decreasing the ability of the airfoil to withstand foreign object damage.

Accordingly, it is desired to provide a hybrid fan blade having improved damping while maintaining FOD resistance.

SUMMARY OF THE INVENTION

A fan blade includes a metal airfoil having first and second opposite sides extending radially between a root and a tip, and axially between a leading edge and a trailing edge. The airfoil further includes a pocket disposed in the first side having an elastomeric filler bonded therein. A panel is bonded to the filler along the pocket for allowing differential movement therebetween for damping vibratory response of the airfoil.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 2 is a radial sectional view above a mid-span portion of the airfoil illustrated in FIG. 1 and taken along line 2—2 near the trailing edge.

FIG. 3 is a radial sectional view above a mid-span portion of the airfoil illustrated in FIG. 1 and taken along line 3—3 near the leading edge.

DESCRIPTION OF THE PREFERRED EMBODIMENT(S)

Figure 1:
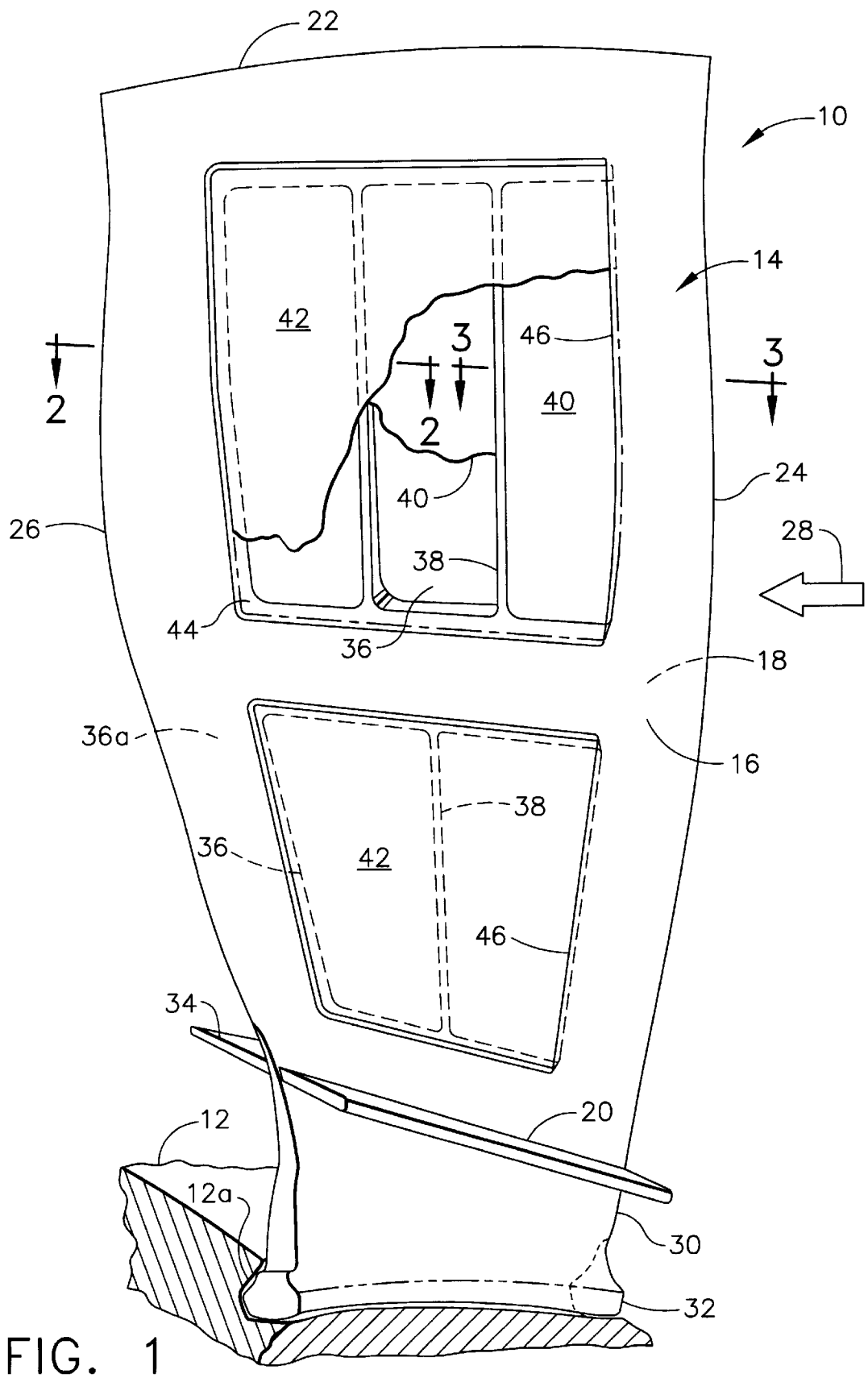
FIG. 1 is an elevational view of an exemplary gas turbine engine hybrid fan blade including panel-closed pockets in accordance with an exemplary embodiment of the present invention.

Illustrated in FIG. 1 is one of several exemplary gas turbine engine fan rotor blades 10 mounted to the perimeter of a rotor disk 12 shown in part. In accordance with the present invention, the blade 10 is configured as a hybrid blade including a metal airfoil 14 having a first or pressure side 16 which is generally concave, and a circumferentially opposite second or suction side 18 which is generally convex. The first and second sides or surfaces 16, 18 extend radially or longitudinally along the span of the airfoil 14 between a radially inner root 20 and an opposite radially outer tip 22.

The first and second sides also extend axially or laterally along the chord of the airfoil between a forward or leading edge 24 of the airfoil and an axially opposite aft or trailing edge 26. Ambient air 28 flows over the two airfoil sides from the leading edge to the trailing edge during operation and is pressurized by the airfoil in a conventional manner for producing propulsion thrust during operation for powering an aircraft in flight.

Although the airfoil 14 may be integrally or directly mounted to the rotor disk 12 in a one piece assembly known as a blisk, in the exemplary embodiment illustrated in FIG. 1 each of the airfoils 14 is removably attached to the disk 12 in a conventional manner. More specifically, the blade 10 further includes an integral metal shank 30 joined integrally with the airfoil root 20 for mounting the blade to the rotor disk 12. This is effected using a conventional metal dovetail 32 joined integrally with the shank 30 for mounting the blade in a complementary dovetail slot 12a in the rotor disk. The airfoil 14, shank 30, and dovetail 32 may initially be formed as a onepiece or unitary metal structure such as by forging. A suitable metal for the fan blade 10 is Titanium, for example.

The dovetail 32 is typically an axial-entry dovetail which is captured in the complementary axial dovetail slot 12a in the perimeter of the rotor disk 12. The shank 30 provides a structural transition from the dovetail 32 to the aerodynamic airfoil 14, and is typically not an aerodynamic member itself. The shank 30 is typically hidden from the airflow 28 by a suitable flow bounding platform 34 disposed at the airfoil root 20 either integrally therewith or as separately mounted platforms between adjacent ones of the blades 10 in a conventional manner.

In accordance with the present invention, the airfoil 14 further includes a plurality of recesses or pockets 36 which preferably are disposed solely in the airfoil first or pressure side 16 and are separated by corresponding metal spars or ribs 38. The ribs 38 are integrally formed in the airfoil 14 and are part of the unitary metal structure thereof. A suitable number of the pockets 36 are provided over the airfoil 14 for substantially reducing its weight while maintaining structural integrity thereof in accordance with the present invention.

The pockets 36 may be suitably formed by machining or casting, for example, and are closed at their bottom ends by the remaining relatively thin portions of the airfoil second side 18, and are open along the airfoil first side 16. By providing the pockets 36 in the airfoil concave side 16, the convex side remains solid metal to maximize moment of inertia stiffness.

The individual pockets 36 are filled with a suitable lightweight filler 40 which may be bonded into the pockets 36. The filler 40 completely fills each pocket 36 just below the outer surface of the airfoil first side 16. The filler 40 may take any suitable form such as an elastomeric-like rubber or fluorosilicone molded and cured to bond in the pockets. The filler is lighter in weight or density than the metal of the airfoil 14 for reducing overall weight of the blade 10. And, the filler 40 also provides internal damping for reducing the vibratory response of the airfoil 14 during operation.

The pockets 36 are relatively large to substantially cover the airfoil first side 16 in one or more groups. The filler 40 in the pocket 36 provides a correspondingly large block of damping material. However, for effectively damping vibratory response of the airfoil 14 during operation, the filler 40 must be deformed in shear which therefore requires load transfer thereto. The filler 40 is attached to the airfoil 14 along the bottom of the individual pockets 36 and along the sidewalls thereof defined in part by the ribs 38. The vibratory response of the airfoil 14 is therefore transferred into the filler 40 at these bonded interfaces.

In accordance with the present invention, a thin face sheet or panel 42 is bonded to the filler 40 along one or more of the pockets 36 for allowing differential movement between the panel and the metal airfoil 14 around the perimeter of the pockets for damping vibratory response of the airfoil during operation. In an exemplary embodiment, one face panel 42 covers the pockets 36 either individually or collectively as desired flush along the airfoil first side 16 and forms part of the airfoil outer surface itself.

The filler 40 is preferably premolded into the pockets 36 just below or at the surface level of the airfoil first side 16, and then the panel 42 is placed in position atop the filler 40 under slight compression to conform the outer surface of the panel 42 with the outer surface of the airfoil first side 16 for providing the required aerodynamically smooth profile thereof. Upon curing of the filler 40, by heating for example, the filler 40 is bonded to the airfoil 14 in each of the pockets 36 as well as being bonded to the inside of the panel 42 for retention thereof.

The panel 42 may be made of a suitable material, such as Titanium metal for example, and is suitably thin, such as about 10–15 mils (0.25–0.38 mm) for example. In this configuration, the filler 40 in each of the pockets 36 is sandwiched between the panel 42 on the open side of the pockets 36 and the airfoil second side 18 at the base of the pockets 36.

In accordance with the preferred embodiment, the panel 42 covers only the pockets 36 and any separating ribs 38 therebetween and is structurally uncoupled from the remainder of the airfoil first side 16 to allow differential movement therebetween for improving vibratory damping. The panel 42 is preferably not attached directly to the surface of the airfoil first side 16 to prevent load transfer therebetween or significant increase in section moment of inertia of the airfoil. This allows the panel 42 to cooperate primarily only with the filler 40 to which it is bonded for increasing damping effectiveness of the filler 40 in the airfoil.

As illustrated in FIG. 1, the airfoil further includes a ledge 44 recessed below the outer surface of the first side 16 which laterally surrounds the one or more pockets 36 at least in part. Although the panel 42 may cover a single pocket 36, in the preferred embodiment illustrated in FIG. 1 a common panel 42 covers three exemplary pockets 36 in the outboard portion of the airfoil 14 bridging the two corresponding ribs 38 therein. Another one of the panels 42 covers a pair of pockets 36 formed in the inboard portion of the airfoil 14 in the exemplary embodiment illustrated in FIG. 1.

As additionally shown in FIG. 2, the panel 42 is bonded atop the ledge 44 by the common filler 40 and overlaps the ledge 44 from the individual pockets 36. The filler 40 provides an adhesive bond between the perimeter of the panel 42 overlapping the ledges 44 and may be relatively thin on the order of 2–10 mils (0.05–0.25 mm). The depth of the ledge 44 and thickness of the filler 40 thereon is selected to position the outer surface of the panel 42 substantially coextensively or flush with the outer surface of the airfoil first side 16 as illustrated in FIG. 2 for providing a substantially continuous and smooth aerodynamic surface.

As shown in FIG. 1 the ledge 44 may be continuous, or alternatively segmented, to extend along three sides of the pockets 36 corresponding to the root 20, tip 22, and trailing edge 26 of the airfoil 14. In this way, the panel 42 blends smoothly into the airfoil first side 16 and is substantially flush therein without flow obstruction.

In the exemplary embodiment illustrated in FIG. 1, the inner and outer panels 42 are generally quadrilateral or rectangular, with each having generally straight edges including a first or inner edge facing the airfoil root, a second or outer edge facing the airfoil tip 22, a third or aft edge facing the airfoil trailing edge 26, and a fourth or forward edge facing the airfoil leading edge 24. The first three edges of the panel 42 are bonded by the filler 40 to the ledge 44 along the three sides of the pockets 36 as illustrated in FIG. 1. In this way, the panel 42 may be positioned coextensively or flush with the airfoil first side 16 along at least the root, tip, and aft edges of the panel 42 for providing an aerodynamically smooth transition therebetween.

As shown in FIG. 3, the airfoil 14 preferably also includes an internal lip 46 extending along the fourth or forward side of the forwardmost pocket 36 which is disposed adjacent to and corresponds to the airfoil leading edge 24. The forward edge of the panel 42 preferably extends under the lip 46 and is bonded thereto by the filler 40 inside the pocket 36 for being captured or retained mechanically by the lip 46 during operation. The forward edge of the panel 42 is suitably configured to complement the lip 46 and minimize any discontinuities in the airfoil first side 16 over which the air flows.

Since the panel 42 is coextensive with the airfoil first side 16 and defines a substantial portion of the airfoil pressure side, it is in direct contact with the airflow thereover and with any foreign objects therein such as sand or birds. Sand or other grit may erode the airfoil 14 over time, with the panel 42 providing increased erosion resistance as compared to solely the filler 40 enclosed thereby.

The airfoil 14 must be sufficiently strong for withstanding at least small bird strikes with little or no damage. However, a bird may strike the panel 42 as it passes from the leading edge 24 of the airfoil toward the trailing edge 26 thereof. By hiding the forward edge of the panel 42 behind the lip 46 of the airfoil 14, the panel 42 is better protected from bird strikes for preventing separation of the panel 42 from the filler 40 along the forward edge of the panel 42. Since the airflow direction is from the airfoil leading to trailing edges, the lip 46 need only be provided along the forwardmost pocket 36 for receiving the forwardmost end of the panel 42. The remaining three sides of the panel 42 may be mounted flush in the airfoil first side 16 atop the corresponding ledge 44 provided therefor.

As shown in FIGS. 2 and 3, each of the ribs 38 includes a generally flat tip 38a which is preferably recessed below the inner surface of the panel 42 and bonded thereto by the common filler 40. The thickness of the filler bond may be like that at the ledge 44 in the exemplary range of about 2–10 mils (0.05–0.25 mm). The panel 42 is thusly bonded to the airfoil over substantially its entire inner surface by the filler 40 which permits differential movement between the panel 42 around its perimeter and the adjoining metal airfoil 14. In this way the airfoil second side 18 constrains the filler 40 from one side, while the panel 42 constrains the filler 40 from an opposite side for promoting strain in the filler 40 and improving damping effectiveness thereof.

As shown in FIG. 2 for example, each of the ribs 38 is preferably concave on opposite sides thereof between the airfoil second side 18 and the rib tip 38a. The filler 40 is therefore bonded to the concave sides of each rib 38 and is mechanically trapped thereby inside the individual pockets 36. The concave sides of the ribs 38 more securely retain the filler 40 inside the pockets 36, and also improve load transfer into the filler 40 to promote strain therein for improving damping. The concave rib sides also provide a suitable fillet radius reducing stress concentration thereat.

As shown in FIG. 2, the aft end of the aft pocket 36 adjacent the airfoil trailing edge 26 is also preferably concave for similar reasons. And, as shown in FIG. 3, the forward end of the forward pocket 36 adjacent the airfoil leading edge 24 is also similarly concave, with the lip 46 being integrally formed therewith.

The airfoil first side 16 including the coextensive panels 42 therein is generally concave and defines the pressure side of the airfoil 14. The pockets 36 are preferably formed through the airfoil pressure side 16, with the panels 42 then covering the filled pockets 36 to complete the outer profile of the airfoil 14. The resulting positive pressure of the air channeled over the airfoil first side 16 further ensures the compression forces on the panel 42 during operation. And, the moment of inertia of the airfoil sections is maximized due to the pockets 36 being formed in the airfoil first, concave side 16 as opposed to the airfoil second, convex side. However, the pockets 36 may be formed in the airfoil convex side if desired in an alternate embodiment.

In accordance with another embodiment illustrated in FIG. 3, the panel may be disposed at the outer surface of the airfoil, or submerged inside the filler 40 below the airfoil surface, or both. For example, an internal panel 42b is illustrated inside the filler 40 and bonded thereto in the trailing edge pocket 36 to further increase shear and improve damping. One or more of the internal panels 42b in a sandwich construction with filler therebetween may be used as desired to further improve shear and damping in any of the pockets 36.

Individual fan blades are typically removably mounted to the perimeter of the fan disk 12 for reducing complexity and associated manufacturing and repair costs. The blade count number thereof is also typically relatively large since this reduces overall system weight. These blades are also relatively thin and low cost, and therefore have less foreign object damage (FOD) strength especially for soft bodies such as birds.

FOD strength may be improved by using wide chord fan blades having a lower span-to-chord aspect ratio over conventional blading. Wide chord fan blades are aerodynamically efficient and structurally robust due to their increased edge thickness which is inversely proportional to the reduction in blade count required therefor. Wide chord blades, however, are expensive to manufacture, and undesirably increase system weight. And, as larger diameter fans are required to increase engine thrust capability, further undesirable weight increases and complexity are required which result in tradeoffs in design. In particular, light weight and low cost are competing objectives.

However, the present invention provides additional advantages which may be used for achieving these competing objectives. The pockets 36 substantially reduce weight, and allow the fan blades 10 to be configured in wide chord embodiments having FOD robustness. For example, FIG. 4 illustrates a plurality of the fan blades 10 joined to the rotor disk 12 by their dovetails 32 to define a fan for an aircraft gas turbine engine powered by a low pressure turbine therein.

In this embodiment, each blade 10 includes the outer pockets 36, filler 40, and enclosing panel 42 disposed adjacent the airfoil tip 22 for reducing blade weight near the tip. Each blade further includes a pair of mid-span shrouds 48 extending integrally outwardly or circumferentially from the opposite sides of the airfoil 14. The shrouds 48 are disposed radially between the panel 42 and the airfoil root 20, and may take any conventional form such as the cantilevered winglets illustrated. The shrouds 48 of adjacent blades are radially aligned with each other in circumferentially abutting contact which stiffens the assembly thereof for controlling the vibratory response of the blades and increasing frequency margin over resonant frequencies.

Since the shrouds 48 are disposed in the air flowpath, they are aerodynamically streamlined to reduce performances losses therefrom. A significant advantage of the pocket/panel design is that the shrouds 48 may now be located further radially inwardly than they would otherwise in view of the lighter weight blade tip region above mid-span. The shrouds still perform their stiffening function, but are now located at a reduced radial position having a significant reduction in airspeed due to rotation of the blades, which in turn reduces performance losses from the shrouds.

Figure 4:
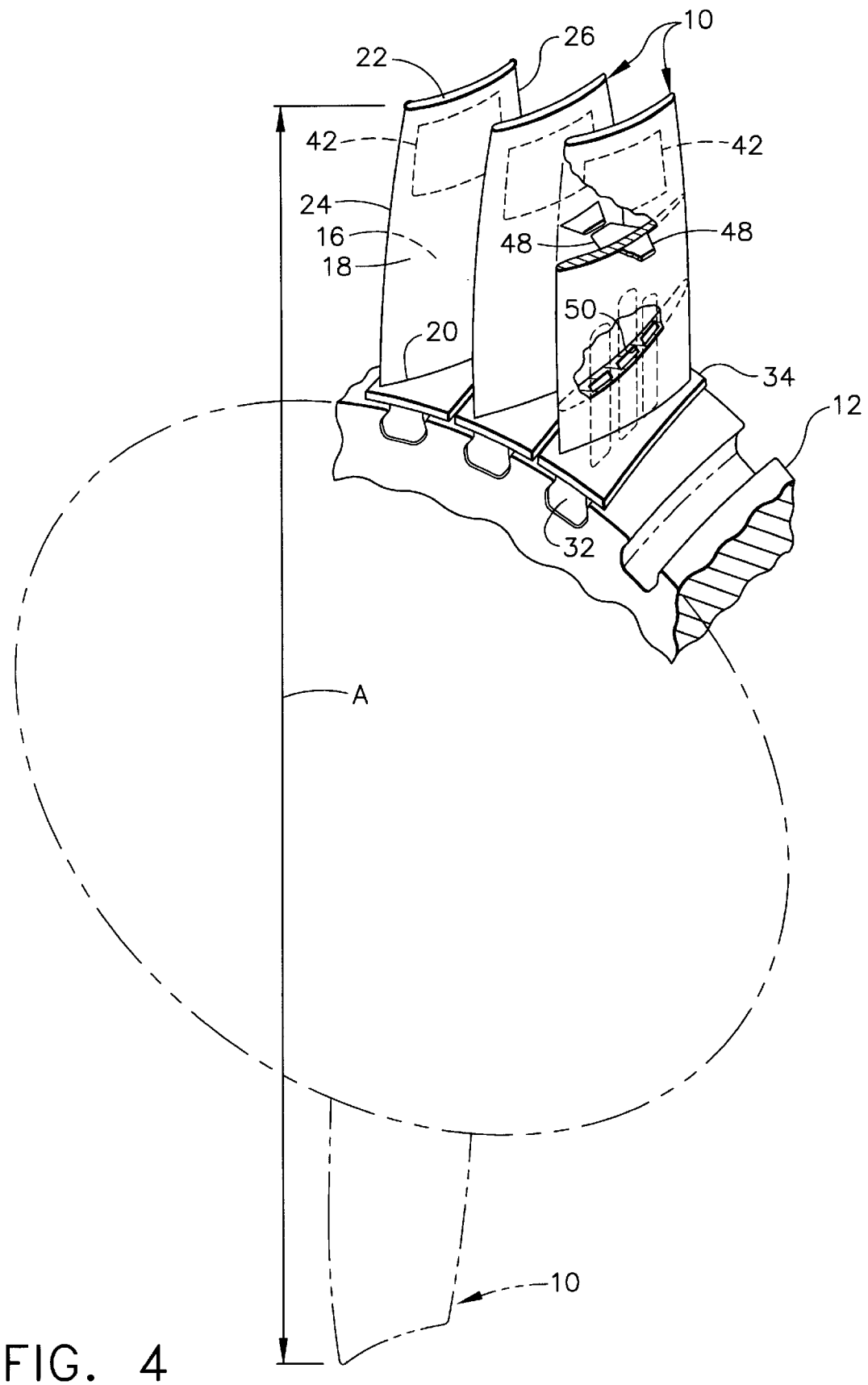
FIG. 4 is a partly sectional, schematic view of fan blades joined to a disk, and including mid-span shrouds in accordance with another embodiment of the invention.

The blades 12 may include the additional pockets 36, filler 40, and inner panel 42 as illustrated in FIG. 1 for further reducing weight, or may instead include a plurality of hollow internal channels 50 which extend radially as shown in FIG. 4. In this embodiment, three channels 50 extend through the dovetail 32, shank 30, and inboard portion of the airfoil 14 between the root 20 and shroud 48 for reducing weight of the blade 10 while maintaining its strength.

In accordance with another advantage of the present invention, the improved shrouded blades 10 may be used to advantage for significantly increasing the outer diameter A of the fan as measured between the tips of diametrically opposite blades, and using lower aspect ratio blading. For fans having a diameter A greater than about 93" (2.36 meters), the combination of wide chord and mid-span shrouds may be used with the weight reducing pocket/panel hybrid design features to simultaneously achieve weight and cost reductions with increased FOD robustness not before attainable in conventional designs.

For example, if the hybrid wide chord blade is too heavy for a 98" (2.8 meter) diameter fan even at a low blade count of 26, then a shrouded embodiment thereof as illustrated in FIG. 4 may be used with a blade count in the range of 32 to 34. The outboard blade span is lightened using the pockets 36, filler 40, and panel 42; and the inboard blade span may be similarly lightened, or lightened using the internal channels 50. The 32–34 blade count would be selected so that the leading edge of the airfoil would be relatively thick and robust against soft body FOD.

For a fan having an outer diameter A of about 110" (2.8 meters) to about 114" (2.9 meters) where system weight is large and hollow titanium blades are too costly, a blade count in the range of 38 to 40 may be used with the hybrid features of the present invention.

Blade frequency response, resultant stability margin, and tip speed are extremely important. The specific radial position of the shrouds 48 will be a function of all three considerations. The hybrid blade as discussed above will aid in the damping of blade resonant frequencies, and may allow the shroud to be moved radially inward to maintain frequency margin, while improving aerodynamic efficiency and weight.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

1. A gas turbine engine fan blade comprising;
   a metal airfoil having first and second opposite sides extending radially between a root and a tip, and axially between a leading edge and a trailing edge for pressurizing air channeled thereover, and a pocket disposed in said first side;
   a ledge surrounding said pocket at least in part;
   an elastomeric filler bonded in said pocket; and
   a panel bonded to said filler and to said ledge by said filler for allowing differential movement between said panel and said airfoil for damping vibratory response of said airfoil.

2. A blade according to claim 1 wherein said ledge is recessed below said first side, and said panel is bonded atop said ledge by said filler.

3. A blade according to claim 2 wherein said ledge extends along three sides of said pocket corresponding to said root, tip, and trailing edge of said airfoil.

4. A blade according to claim 3 wherein said airfoil further includes an internal lip extending along a fourth side of said pocket corresponding to said airfoil leading edge, and said panel extends under said lip inside said pocket for being captured thereby.

5. A blade according to claim 4 wherein said panel is quadrilateral with first, second, and third edges being bonded by said filler to said ledge along said three sides of said pocket, and a fourth edge bonded by said filler under said lip along said fourth side of said pocket.

6. A blade according to claim 5 wherein said panel covers said pocket and is coextensive with said airfoil first side along at least said first, second, and third edges thereof.

7. A blade according to claim 2 wherein said airfoil further includes a plurality of said pockets separated by a corresponding rib and said panel covers said pockets bridging said rib.

8. A blade according to claim 7 wherein said rib includes a tip recessed below said panel and bonded thereto by said filler.

9. A blade according to claim 8 wherein said rib is concave between said airfoil second side and said rib tip and bonded to said filler for trapping said filler in said pocket.

10. A blade according to claim 8 wherein said airfoil first side is a generally concave, pressure side.

11. A blade according to claim 1 wherein said pocket and panel are disposed adjacent said airfoil tip, and further comprising a mid-span shroud disposed between said panel and airfoil root and extending outwardly from said metal airfoil.

12. A blade according to claim 11 further comprising a plurality of internal channels extending radially between said root and shroud for reducing weight of said blade.

13. A blade according to claim 12 in combination with a rotor disk, and further comprising:

an integral dovetail joined to said airfoil root; and said disk includes a plurality of said shrouded blades joined thereto by said dovetails to define a fan.

14. A fan according to claim 13 having an outer diameter of about 2.5 m with a blade count in the range of 32 to 34.

15. A fan according to claim 13 having an outer diameter of about 2.8 m with a blade count in the range of 38 to 40.

16. A blade according to claim 1 wherein said panel is submerged inside said filler in said pocket.

17. A blade according to claim 1 further comprising a plurality of said panels bonded to said filler in said pocket.

18. A gas turbine engine rotor blade comprising an airfoil including a pocket in one side thereof surrounded at least in part by a ledge and covered by a panel bonded to said ledge by an elastomeric filler in said pocket for allowing differential movement between said panel and said airfoil for damping vibratory response of said airfoil.

19. A blade according to claim 18 wherein said filler separates said panel from said airfoil.

20. A blade according to claim 19 wherein said panel laps said airfoil around said pocket, and is disposed substantially flush with said airfoil.

* * * * *